(12) United States Patent
Arolovitch (10) Patent No.: US 11,477,272 B2
(45) Date of Patent: Oct. 18, 2022

(54) METHOD AND SYSTEM FOR TRANSMITTING DATA IN A COMPUTER NETWORK

(71) Applicant: Zephyrtel, Inc., Austin, TX (US)

(72) Inventor: Alan Arolovitch, Brookline, MA (US)

(73) Assignee: Zephyrtel, Inc., Austin, TX (US)

( * ) Notice: Subject to any disclaimer, the term of this patent is extended or adjusted under 35 U.S.C. 154(b) by 0 days.

(21) Appl. No.: 14/457,531

(22) Filed: Aug. 12, 2014

(65) Prior Publication Data

US 2015/0163296 A1 Jun. 11, 2015

Related U.S. Application Data

(63) Continuation of application No. 12/350,105, filed on Jan. 7, 2009, now abandoned.

(60) Provisional application No. 61/019,576, filed on Jan. 7, 2008.

(51) Int. Cl.
| | |
|---|---|
| *H04L 67/1004* | (2022.01) |
| *H04L 67/1061* | (2022.01) |
| *H04L 67/104* | (2022.01) |
| *H04L 65/612* | (2022.01) |
| *H04L 67/01* | (2022.01) |
| *H04L 67/51* | (2022.01) |

(52) U.S. Cl.
CPC ........ *H04L 67/1004* (2013.01); *H04L 65/612* (2022.05); *H04L 67/01* (2022.05); *H04L 67/104* (2013.01); *H04L 67/1072* (2013.01); *H04L 67/51* (2022.05)

(58) Field of Classification Search
CPC ............. H04L 65/4084; H04L 67/1004; H04L 67/1072; H04L 67/104; H04L 67/16; H04L 67/42
USPC ......................................... 709/225, 217, 227
See application file for complete search history.

(56) References Cited

U.S. PATENT DOCUMENTS

| | | | | |
|---|---|---|---|---|
| 7,797,198 | B1 * | 9/2010 | Frederick | ........... G06Q 30/0601 705/26.1 |
| 8,923,853 | B1 * | 12/2014 | Shaw | ...................... H04W 8/12 455/432.1 |
| 2003/0074507 | A1 * | 4/2003 | Weber | ................... G06F 9/4887 710/240 |
| 2003/0228869 | A1 * | 12/2003 | Chow | ................... H04W 88/06 455/432.2 |
| 2004/0148344 | A1 * | 7/2004 | Navar | ..................... H04L 29/06 709/203 |
| 2005/0198359 | A1 * | 9/2005 | Basani | ................. H04L 69/329 709/232 |

(Continued)

OTHER PUBLICATIONS

Non-Final Office Action dated Feb. 12, 2014, mailed in U.S. Appl. No. 12/350,105, pp. 1-21.

(Continued)

*Primary Examiner* — David R Lazaro
*Assistant Examiner* — Mariegeorges A Henry (57) ABSTRACT

An optimization service discovery method for optimizing data transmission by multi-session applications, includes: receiving an optimization service lookup query from one of a plurality of user clients in a network, each of said user clients executing a multi-session application; and identifying an optimization service and responding to the query with a network address of one or more servers providing said optimization service.

24 Claims, 3 Drawing Sheets

(56) References Cited

U.S. PATENT DOCUMENTS

| | | | |
|---|---|---|---|
| 2006/0161670 A1* | 7/2006 | Andersen | H04L 29/06 709/230 |
| 2006/0212584 A1* | 9/2006 | Yu | G06F 17/30902 709/227 |
| 2007/0038792 A1* | 2/2007 | Shin | G06F 13/1626 710/240 |
| 2007/0169149 A1* | 7/2007 | Jennings | H04N 7/165 725/58 |
| 2008/0279216 A1* | 11/2008 | Sharif-Ahmadi | H04L 47/14 370/465 |
| 2008/0281908 A1* | 11/2008 | McCanne | G06F 17/30156 709/203 |
| 2009/0089438 A1* | 4/2009 | Agarwal | H04L 29/12066 709/228 |
| 2009/0144390 A1* | 6/2009 | Previdi | H04L 45/18 709/217 |
| 2010/0005171 A1* | 1/2010 | Arolovitch | H04L 67/1004 709/225 |

OTHER PUBLICATIONS

Request for Continued Examination (RCE) and RCE Submission as filed in U.S. Appl. No. 12/350,105 dated Nov. 14, 2011, pp. 1-16.
Final Office Action dated May 12, 2011, mailed in U.S. Appl. No. 12/350,105, pp. 1-22.
Response to Non-Final Office Action dated Aug. 23, 2010, as filed in U.S. Appl. No. 12/350,105 on Feb. 23, 2011, pp. 1-14.
Non-Final Office Action dated Aug. 23, 2010, mailed in U.S. Appl. No. 12/350,105, pp. 1-18.

* cited by examiner

METHOD AND SYSTEM FOR TRANSMITTING DATA IN A COMPUTER NETWORK

CROSS REFERENCE TO RELATED APPLICATIONS

This application is a continuation of U.S. patent application Ser. No. 12/350,105 filed on Jan. 7, 2009 entitled METHOD AND SYSTEM FOR TRANSMITTING DATA IN A COMPUTER NETWORK, which claims priority from U.S. Provisional Patent Application Ser. No. 61/019,576, filed on Jan. 7, 2008, entitled DATA TRANSMISSION IN PEER-TO-PEER NETWORKS, both of which are hereby incorporated by reference.

BACKGROUND

The present application relates generally to transmission of data such as, e.g., media content, over computer networks such as, e.g., the Internet.

Traditionally, Internet content is delivered through a client-server approach, where a client (such as, e.g., a personal computer) retrieves a content object from server (such as, e.g., a Web server) in a single download session.

Content Delivery Networks (CDNs) have been used to improve the traditional client-server method of content delivery by placing the content object in a variety of network locations and directing the client to particular servers, depending on network locality, network cost, network conditions, server load, and other factors. Once a session between the client and a server has been established, the client-server applications are generally limited in their ability to work around session throughput degradation or failure. Furthermore, the use of single session to deliver the content limits the throughput that can be achieved by the application.

These drawbacks of the client-server architecture are particularly significant in the context of delivery of high-quality media over Internet. Online media applications commonly involve delivery of very large content objects over an extended period of time, or have high throughput requirements.

Thus, content delivery systems are available that use dynamic selection of content sources and multiple sessions to work around the above problems.

Use of a multi-session approach delegates content sourcing logic to the client application and allows these applications to adapt to changing session throughput, to recover from session failures, to maximize content delivery throughput using several concurrent sessions.

Peer-to-peer (P2P) applications are one example of such application architecture. P2P applications are a class of network applications where each network member, or peer, is capable of sending and receiving data directly from other members of the network. Each such peer establishes a number of sessions to its counterparts in parallel, tearing and setting up multiple sessions throughout an application session.

It is not uncommon for P2P networks to scale to very large number of participating peers, exceeding the scale of the traditional CDNs by 2-3 orders of magnitude. The scale of storage and bandwidth resources that P2P networks leverage enables delivery of very large content objects to a large number of subscribers.

There are several known types of P2P networks. The so-called open P2P networks rather than use dedicated servers located in datacenters or in network aggregation points, leverage voluntarily participating Internet subscribers to deliver content. As a result, peers continuously join and leave the P2P network, creating statistical availability of content sources within a network.

Commercial P2P networks can complement peer-based delivery with client-server delivery through their own datacenters or commercial CDNs to improve data transfer service levels.

Yet another type of P2P network leverages always-on IP-connected consumer electronics devices that are connected to the Internet such as, e.g., IP set-top boxes.

In addition to the P2P applications, where each client is capable of being a server as well, the same multi-session approach has been adopted by non-P2P applications that use multiple sessions to dedicated servers to retrieve content.

The success of the multi-session applications, mainly P2P, has led to significant increases in bandwidth consumption globally in the last decade where Internet Service Providers (ISPs) are bearing the bulk of cost associated with these applications.

It is common for the multi-session content applications to optimize content source selection and session throughput in accordance with various application algorithms, (e.g., minimum session throughput for video streaming applications, "tit-for-tat", "rarest-piece-first" etc.), leading to improved application performance, fault tolerance, and reduction of content delivery costs.

At the same time, these applications generally do not align content sourcing and bandwidth allocation decisions with the ISP network environment they operate in, including bandwidth provisioning, network peering and transit arrangements, bandwidth consumption by other applications, etc. This misalignment can lead to network congestion in various parts of the ISP network, on one hand, and suboptimal performance of the multi-session applications, on the other hand. There is thus a need for comprehensive management infrastructure for the multi-session applications that would optimize the application performance through improved usage of network resources and manage utilization of these resources by the applications.

BRIEF SUMMARY

In accordance with one or more embodiments of the invention, an optimization service discovery method is provided for optimizing data transmission by multi-session applications. The method includes: receiving an optimization service lookup query from one of a plurality of user clients in a network, each of said user clients executing a multi-session application; and identifying an optimization service and responding to the query with a network address of one or more servers providing said optimization service.

In accordance with one or more embodiments of the invention, a method of providing a network prioritization optimization service for delivery of content to one of a plurality of user clients in a network is provided. The method comprises: receiving a query for content source prioritization from one of a plurality of user clients in a network, each of said user clients executing a multi-session application; and responding to the query with an identification and network addresses of a set of content sources and an order of priority of the content sources.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

DETAILED DESCRIPTION

In accordance with various embodiments of the invention, a plurality of services are provided that optimize multi-session application performance, and help manage utilization of network resources. These services as described in further detail below include (a) caching and acceleration service, (b) content origination service, (c) network prioritization service, (d) peer discovery service, (e) bootstrapping service for distributed networks, (f) QOS arbitration service, and (g) NAT traversal service.

(a) Caching and Acceleration

A content cache identifies a data query originated by an application running in same network. If the requested data item is stored in the cache, it responds to the query, delivering the requested data item or portion of it. Otherwise, it arranges to have the data item to become stored in the cache, so that it can respond to subsequent queries for the same content item, or portion of it.

Caching eliminates repetitive transfer of popular content items or its portions across congested or expensive parts of the service provider network, e.g., international transit links, or upstream last-mile links in cable provider networks.

Use of a caching infrastructure results in reduction of network congestion and accelerated data delivery rates because the cache is situated near-by, achieving localization of content delivery and prevents the data delivered from cache from traversing congested or constrained network links.

The caching infrastructure may comprise highly available IP-enabled devices, e.g., one or more dedicated servers, IP-enabled set-top boxes, or other always-on IP nodes, or combination of the above The acceleration resulting from caching commonly improves quality of experience (QoE) of end users, by improving reliability of content delivery and supporting delivery of higher quality content (b) Content Origination Content origination involves placement of a content object from temporary location into permanent storage, based on one or more network-based storage nodes. Upon completion of the placement, the content origin service becomes the source of the content object for all parties interested in retrieval of it and can respond to queries related to the content stored in it. The temporary location can be a subscriber's PC or other IP-connected device, e.g., in case of user-generated video content, e-mail etc., or an external dedicated server.

The content origination service may implement replication of content across multiple nodes in the network to achieve locality of delivery, to that achieved by the caching service, as described above.

The persistent storage nodes comprising the content origin service may include, e.g., dedicated servers, IP-enabled set-top boxes, or other highly available IP-enabled devices with storage capabilities.

A difference between content origination and caching is that placement of content in the former case takes place without regard for subscribers' demand, and in case of absence of requested content object or part of it, in the content origin server, unlike cache, it does not fall back on other content sources to serve the request.

(c) Network Prioritization

An important part of each multi-session application is determining where to retrieve the content from. Furthermore, in case of P2P applications, each application node is generally at liberty to choose where to send the content to as well.

The content source selection may take into account the rate of past contribution by each peer in case of P2P, portion of content item available at each peer and wider availability of that portion, as well as additional application-specific peer characteristics.

The network prioritization service can provide a way to adjust these decisions in accordance with service provider priorities. The priorities may reflect network distance between the client application and content source, an administrative network policy that the service provider would like to enforce, or actually enforce on their networks, cost related to data transfer between client application and the content source, network capacity provisioning or a combination of the above.

The network prioritization service can re-prioritize the content sources known to the application, based on the above ISP's priorities, or expose these priorities in an abstract form, allowing the multi-session application to re-prioritize its own sources.

The network prioritization can be requested directly by the ISP subscriber's application, or by a server-side application component (e.g., Bittorrent tracker) on subscriber's behalf.

The peer selection informed by network prioritization allows peers to connect to more advantageous content sources faster, improving data delivery rates.

The network prioritization policies that take into account location of the content sources can also improve locality of the data transfer, decreasing network congestion and delivery costs incurred by the service providers.

The network policy can reflect arbitrary definition of administrative costs of network resources, or automatic definition of costs based on monitoring of network congestion and network faults, or a combination of both.

Thus, the network policy exposed through the network prioritization service can help service providers to route the traffic around particular a network area in the event of a network fault.

The prioritization infrastructure can expose static priorities, applicable to all application nodes, or adaptive priorities that take into account specific application node location in the network.

The network policy can change depending on time of day, so that, e.g., batch delivery applications can take advantage of additional network resources available in off-peak hours or varying networking costs. The resulting policy can reflect a policy of single service provider, or single third party, or an aggregation of multiple service providers and/or third parties.

In particular, a priority of connection between peer A and peer B could be affected by service provider of peer A, service provider of peer B, any intermediate service provider linking between service providers of peers A and B, or any combination of the above.

(d) Peer Discovery

Generally, every node in a multi-session application uses one or more application-specific methods to discover content sources to connect to. Thus, Bittorrent clients can use tracker-based peer discovery, tracker-less peer discovery (DHT), peer exchange, and passive peer collection.

The peer discovery service acts as a complementary source of application content source discovery for multi-session applications.

The service records and collates information about user clients that are connected to it, and shares this information or subset of it with other user clients connecting to it, similarly to how indexing servers operate in P2P applications (e.g., a Bittorrent tracker, Donkey server etc.).

The peer discovery service can further expand a list of known content sources by pro-actively retrieving lists of peers through peer exchange mechanisms, if available, and by querying global peer discovery sources, such as trackers and distributed hash table (DHT) networks.

The peer discovery service may further use pre-assembled set of dedicated content servers (e.g. CDN servers) or employ other mechanisms for discovery of available dedicated content source The peer discovery service can optimize the peer collection process through collecting the peer information for most popular items only, or on the other hand, for least popular items that have least amount of content sources.

(e) Bootstrapping For Distributed Networks

Several peer-to-peer applications make use of fully distributed peer-to-peer networks for search and/or retrieval of content (e.g. Bittorrent DHT, Kademlia etc.). Such distributed networks usually bootstrap the process by connecting the previously contacted nodes first.

The bootstrapping service provides faster initialization by providing an always-on well-known node that can be used by P2P clients to connect to the distributed network.

(f) QoS Arbitration

The QoS arbitration service allows application to negotiate better class of service at an ISP-based Quality of Service (QoS) infrastructure, used to prioritize some classes of traffic over other and allocate network resources for authorized applications on demand. The QoS infrastructure types include last-mile QoS (e.g., PCMM and TR-59), transparent Layer7 DPI bandwidth management, and router-based DiffServ QoS etc.

The QoS arbitration service provides an efficient way for QoS infrastructure to classify and manage multiple sessions created by multi-session applications using advanced application-level classification, including, but not limited to, differentiation based on identity and type of content object, type of multi-session application or service, user identity and more, all in cooperative fashion. Thus, QoS infrastructure type lacking deep packet inspection (DPI) Layer7 classification capabilities, may offer such capabilities through use of the QoS arbitration service Furthermore, DPI-based bandwidth management devices may now differentiate content applications based on content identity, e.g. between open and commercial flavors of same P2P application.

The QoS arbitration service enables secure negotiation of improved service levels for authorized content applications, across all sessions created by the multi-session applications. The arbitration service communicates with the content application on one hand, and inline QoS elements on the other, providing secure clearance of service level for multiple sessions created by the application.

The content applications making use of the QoS arbitration service, may use custom L3/L4 identifiers, such as outbound ports, or embed custom L7 tokens into the session (e.g., HTTP cookies or Bittorrent extension field values), to enable scalable and granular classification of all application sessions.

Furthermore, the inline QoS elements may authenticate particular sessions and/or tokens through communication with the arbitration infrastructure.

(g) NAT Traversal

One very common form of residential Internet use is the home network, where several computers connect to Internet through a router or firewall that performs a network address translation (NAT), mapping all computers in the home network to one public IP address.

In the case of peer-to-peer applications, the NAT setup makes it difficult to create a connection to a peer located inside the home network from the outside. The NAT traversal limitations bar multiple peers from contributing to the peer-to-peer network, decreasing overall efficiency of the network. Personal and enterprise firewalls are another common cause of the same.

The NAT traversal infrastructure element (or rendezvous point) serves as a forwarder of data between peers in P2P network, enabling 100% success of inter-peer connection setup. All peers behind NAT device or firewall open a connection to the designated rendezvous point, which then accepts connections on their behalf, forwarding the data between the peers. The peers making use of the rendezvous point may advertise rendezvous point IP address as their address in peer-to-peer networks. The rendezvous point may act as full proxy, transferring actual data between NAT peers, or facilitate opening of connection, when the connection can be opened in one direction but not the other.

In accordance with one or more embodiments of the invention, a method of optimization of data transfer for multi-session applications is provided that combines at least two types of services (a) to (g), as described above.

In accordance with one or more embodiments, a system is provided for optimization of data transmission to multi-session applications, which includes at least one server designed and configured to provide at least two of services from (a) to (g), as described above.

In accordance with one or more embodiments, the system resides in a single or multiple service provider networks, or in dedicated hosting location.

In accordance with one or more embodiments, a part of the server comprising the system resides in a single or multiple service provider networks, while other parts reside outside of such network(s) in dedicated hosting location(s).

In accordance with one or more embodiments, the system provides services (a) to (g), as described above, for one type of multi-session application.

In accordance with one or more embodiments, the system can provide services (a) to (g), as described above for multiple applications.

In accordance with one or more embodiments, the system can utilize an application-specific protocol or protocols to discover and deliver the services (a) to (g), or use the common protocol for all applications making use of the system.

In accordance with one or more embodiments, the system is a part of a multi-session application and/or peer-to-peer network.

In accordance with one or more embodiments, a multi-session application can make use of the system through service discovery process and subsequent utilization of the service.

In accordance with one or more embodiments, the service discovery process makes use of common naming scheme and/or protocol for all or part of above services from (a) to (g).

In accordance with one or more embodiments, the service discovery and utilization of the services can occur by peers in peer-to-peer networks, to optimize their data transfer sessions.

In accordance with one or more embodiments, services can be utilized by the server-side application components, such as trackers, indexing servers, application management servers etc., or other peers, on behalf of other peers in the network.

In accordance with one or more embodiments, the system may enforce conditional access to one or more services, based on multi-session application type or protocol, content item requested, subscriber information, geographical or network location of the party requesting service, password or other form of authorization token etc, or additional type of conditional policy, or combination of the above.

In accordance with one or more embodiments, the system can condition access to one service on previous use of other services. For example, the system can help mediate service level at inline QoS devices only if particular peer made use of peer selection and caching services first.

Methods and systems in accordance with various embodiments of the invention can provide for optimization and network management of multi-session content applications, which can be used to help improve key performance indicators of these applications, reduce congestion in different parts of service provider network and control utilization of bandwidth resources by these applications. Such key performance indicators can include, depending on the type of content application, the time that it takes to retrieve a single content object or guaranteed sustained throughput.

As used herein, the term "user client" generally refers to a computer or other IP-connected device, and includes, but is not limited to, personal computers (PCs), personal digital assistants (PDAs), smartphones, set-top boxes, IP-enabled television sets, consumer network storage appliances, and telephones having computer capabilities.

As used herein, the term "content server" generally refers to a computer or other IP-connected device with attached storage that is capable of responding to queries for content objects and is preferably provisioned to be highly available.

As used herein, the term "content object" generally refers to an identifiable content or data item, which can be in a form of file or stream of data.

As used herein, the term "multi-session application" generally refers to a software program operating on a user client that is capable of using more than one session to receive and/or send content object.

As used herein, the term "peer-to-peer application" generally refers to a multi-session application that is capable of both receiving and sending a content object to other peer-to-peer applications.

As used herein, the term "server-side application component" generally refers to software program providing application-specific network services to multiple user clients that operate particular type of multi-session application, and includes, but is not limited to, peer-to-peer indexing servers, Bittorrent trackers, and eDonkey servers.

As used herein, the term "optimization service" generally refers to a set of one or more distinct and separately addressable servers that together provide a distinct set of functionality that can be invoked by user clients and/or server-side application components and/or other optimization services within the system.

As used herein, the term "QoS device" includes, but is not limited to, QoS-capable core router or network switch, supporting quality of service (QoS) based on DiffServ standard, deep packet inspection (DPI) bandwidth management device, broadband aggregation router supporting Packet Cable MultiMedia (PCMM) framework, or any other network element capable of differentiating various types of Internet traffic and prioritizing one type over another.

As used herein, the term "service locator" generally refers to a component of the systems described herein that is responsible for lookup of optimization service network address by user clients and/or server-side application components and/or other optimization services.

As used herein, the term "content source" generally refers to at least one peer-to-peer application and/or content server.

As used herein, the terms "optimize," "optimal," "optimization," and any variations thereof, generally refer to improving performance and efficiency, and are not intended to necessarily indicate any maximum or minimum values.

In accordance with one or more embodiments, several optimization services are combined to help optimize various aspects of multi-session application operation, either separately or through combination of several such optimization services.

Specifically, the optimization services of the system may help accelerate content delivery by placing and/or caching content closer to the client applications, and/or by improving session throughput through selection of content sources that take into account network conditions, network capacity and existing network policies, and/or by reducing time that it takes for a client application to connect to the network, and/or by helping the client application discover additional content sources, and/or by increasing number of sessions that can result in data throughput, increasing overall session throughput, and/or by guaranteeing minimum throughput or class of service for sessions established by the application, using network equipment providing quality-of-service (QoS) services.

Furthermore, the optimization services of the system can help manage utilization of bandwidth resources and reduce associated network costs incurred by the multi-session applications, by directing these applications to retrieve content from particular application content sources, while optionally avoiding other application content sources, and/or by directing the client applications to retrieve content from caches and/or origin servers, that are part of the system.

The decision to direct the client application to particular application content source and/or cache and/or origin server may take into account the following aspects of content delivery: topological network locality, cost of links between client application and content source, network congestion of the links between client application and content source, compliance with network management policies, alignment with network provisioning and capacity allocation.

Furthermore, the system may be used to optimize retrieval of content by the client application situated on a particular network, and/or content retrieval by client applications situated outside of a network from client applications situated on that network.

Figure 1:
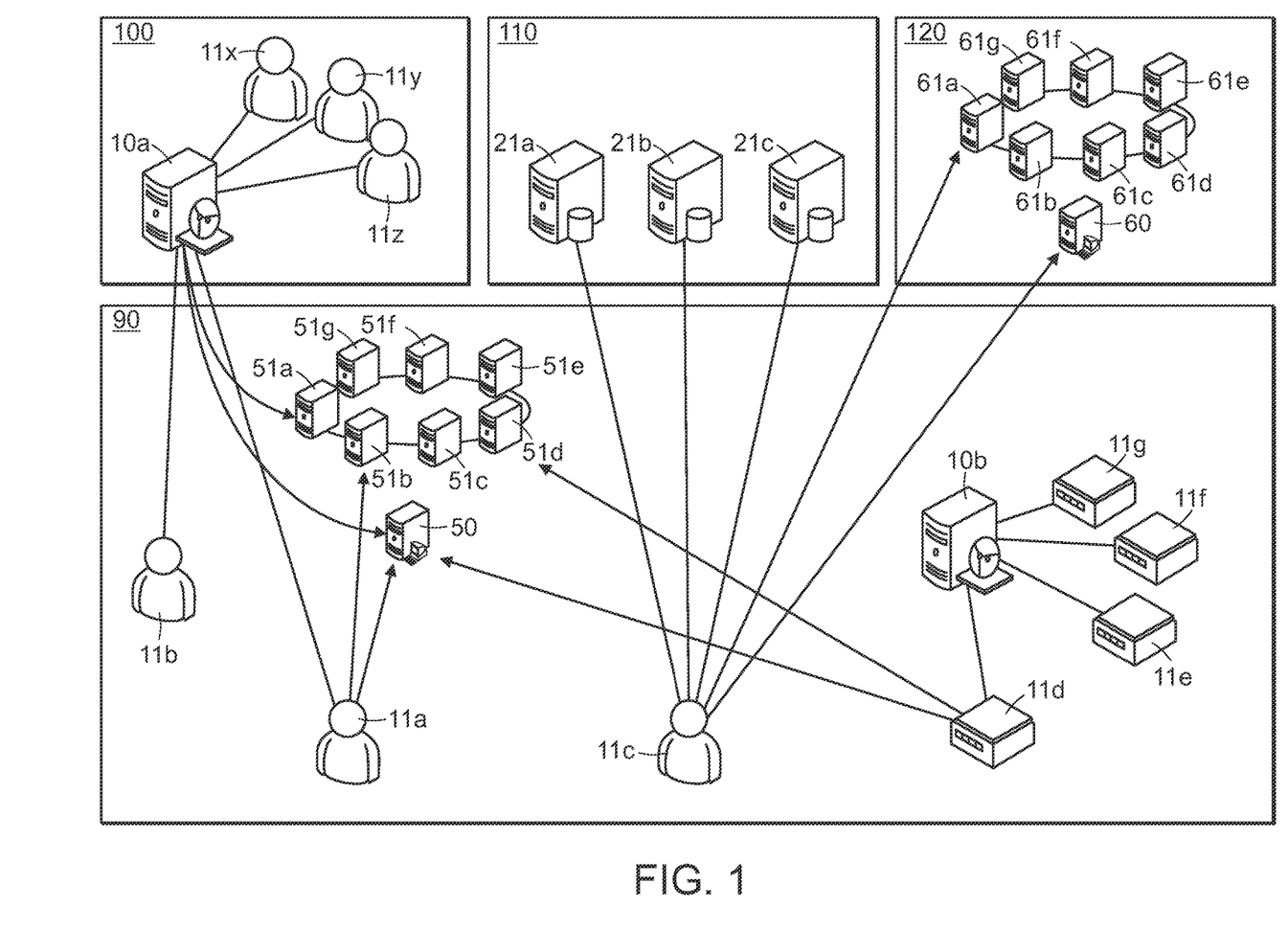
FIG. 1 is a diagrammatic representation of components of a system in accordance with one or more embodiments of the invention.

Referring now to the drawings, FIG. 1 illustrates a system 200 for optimization of data transmission by multi-session applications. According to one or more embodiments, the system includes a plurality of user clients 11 (11a, 11b, 11c, 11x, 11y, 11z) operating in respective networks 90, 100. Each user client 11 operates a multi-session application for implementing queries for content objects and, in case of peer-to-peer applications, providing response to such queries.

According to one or more embodiments of the invention, the system includes several distinct pluralities of multi-session applications, of different type, e.g. peer-to-peer applications running on user clients of IP set-top box type 11d, 11e, 11f and 11g, together with an application server-side component 10b, all located in network 90; user client 11c located in network 90 and content servers 21 (21a, 21b and 21c) in a dedicated network 110; user clients 11a, 11b, 11x, 11y and 11z, running peer-to-peer application and an application server-side component 10a.

According to one or more embodiments of the invention, the system 200 includes a plurality of dedicated content servers 21 (21a, 21b, 21c), operating in a dedicated network 110 (e.g. CDN, hosting provider network or other datacenter), capable of responding to queries for content objects, originated by user clients 11.

One or more embodiments of the invention are directed to optimization service discovery. A user client 11a sends a service look-up query to service locator 50. The service locator 50 responds to the query with a network address of one or more servers, comprising a requested optimization service 51 (51a-g).

According to some embodiments, the service locator 50 responds with an address of an optimization service 51 following successful authentication and/or authorization of requesting user clients 11 and/or server-side application component 10 and/or optimization service 51. The authorization performed by the service locator may take into account a variety of factors, including, but not limited to, network address of the requesting party, type of multi-session application used, type of optimization service request, time of day, load of service locator and/or optimization services, as well as any combination of the above.

In accordance with one or more embodiments, the service locator 50 may choose to return network addresses of only some of the servers comprising the requested optimization service. The selection may take into account a variety of factors, including load balancing algorithms, actual current load of the servers, network distance and/or network cost between the servers and user client 11 requesting the service, availability of the servers, administrative policy, time of day, as well as any combination of the above.

In accordance with one or more embodiments, the service locator 50 is implemented using network infrastructure elements existing independently of the system, including, but not limited to Domain Naming System (DNS) servers, Lightweight Directory Access Protocol (LDAP) servers.

In accordance with one or more embodiments, the service locator 50 is implemented using one of or more accepted standards for discovery of network services, such as Common Object Request Broker Architecture (CORBA), RESTful Web Services, and Web Services based on Simple Object Access Protocol (SOAP).

In accordance with one or more embodiments, the service locator 50 is implemented using network infrastructure elements existing independently of the system 200, including, but not limited to Domain Naming System (DNS) servers, Lightweight Directory Access Protocol (LDAP) servers.

The user client 11 is then connected to at least one optimization service 57.

In accordance with one or more embodiments, the system 200 may contain only some types of the optimization services. In this case, the service locator 50 returns an error response for queries trying to discover optimization services unavailable in particular instance of system 200.

Figure 2:
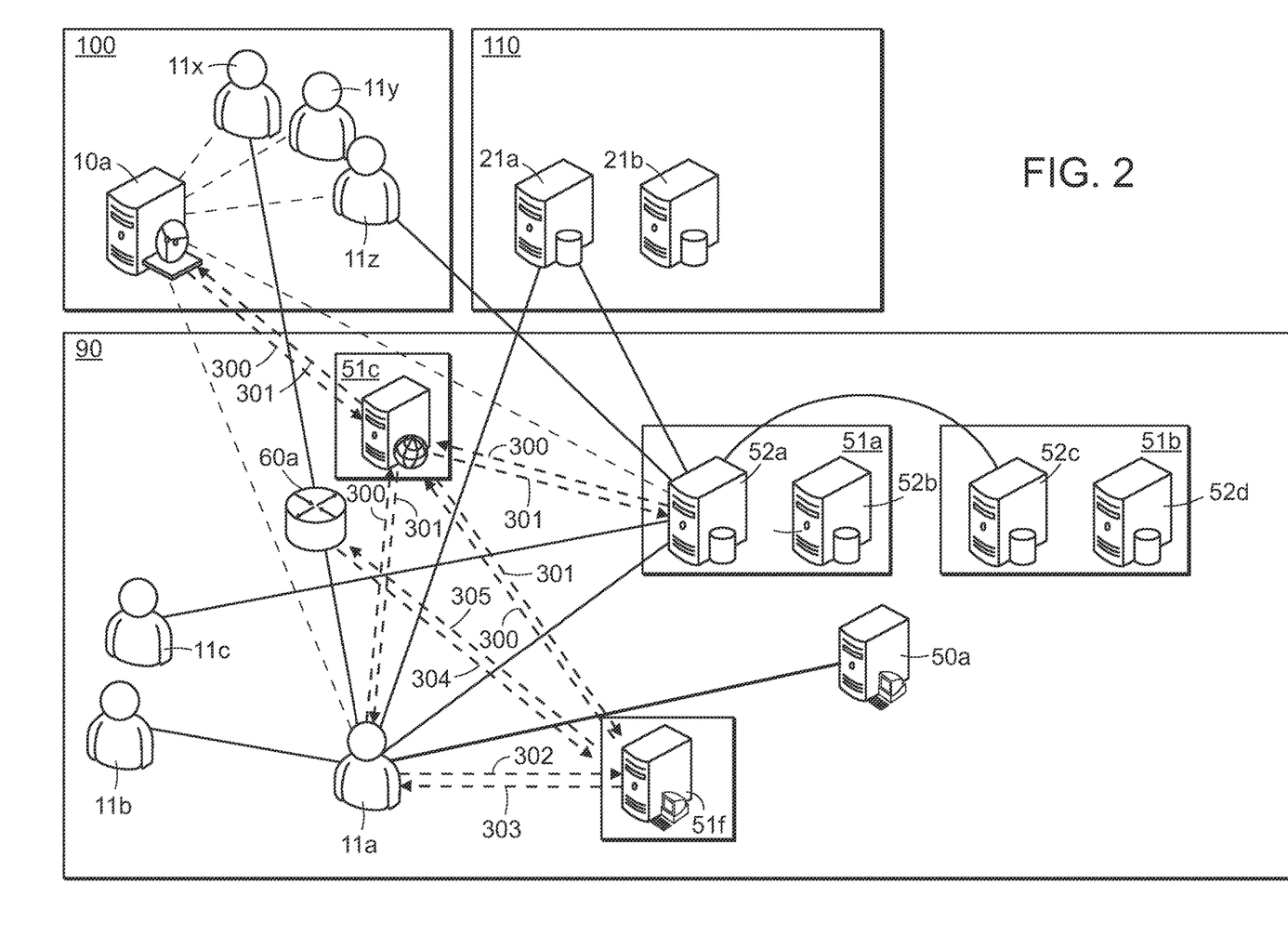
FIG. 2 is a diagrammatic representation of components of a system in accordance with one or more embodiments of the invention.
Figure 3:
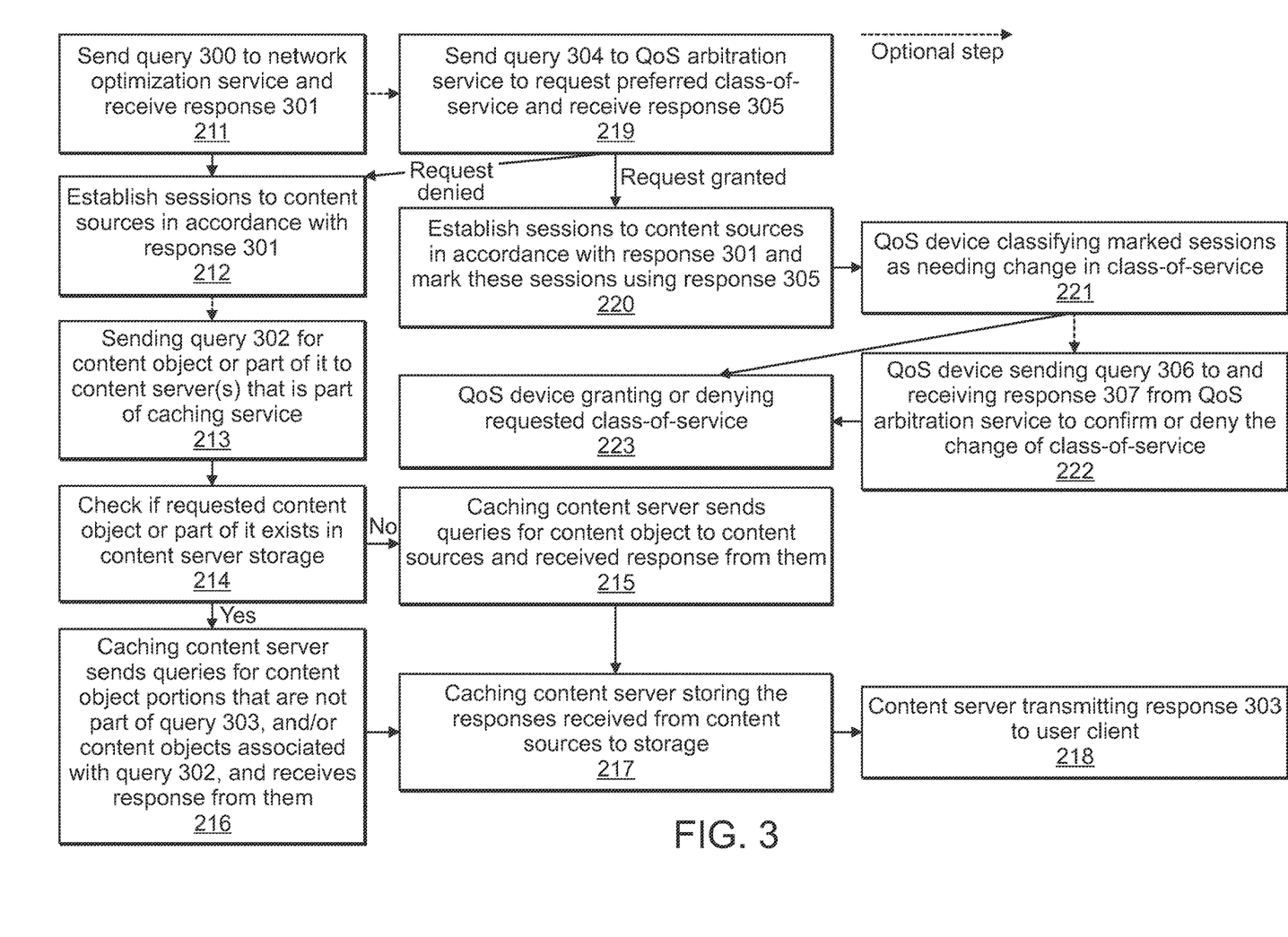
FIG. 3 is a flow chart illustrating a method in accordance with one or more embodiments of the invention.

FIGS. 2 and 3 illustrate a method 210 and system for managing bandwidth utilized by multi-session application 11a in accordance with one or more embodiments of the invention.

The method 210 optionally includes the step of optimization service discovery by multi-session application 11a, using service locator 50.

The method 210 includes step 211 of multi-session application 11 sending a query 300 to network prioritization optimization service 51c and receiving a response 301 from it.

According to some embodiments of this invention, the query 300 includes a list and/or lists of addresses of content sources known to the multi-session application, and the response 301 includes the list of content sources 310 in order of priority and/or with explicit priority attached to each content source.

Alternatively or additionally, the query 300 may include a request for a list 311 of addresses of Internet subnets, listed by priority, and the response 301 includes such list. The list 311 may use IP network addresses together with network masks (e.g. 1.1.1.0/24) and/or autonomous system numbers (ASNs) to define the Internet subnets.

According to some further embodiments of this invention, the response 301 may alternatively or additionally include a list of content sources addresses 312 that were previously unavailable to the multi-session application, including, but not limited to addresses of user clients that operate peer-to-peer applications, content servers 21 located in a dedicated network 110 or content servers 52 comprising caching optimization service 51a and/or content origin service 51b.

According to some further embodiments of this invention, the network prioritization optimization service can use peer discovery optimization service to produce list 312.

According to some further embodiments of this invention, the priorities indicated in response 301 are comprised of a sets of priorities, where each priority has validity period attached to it; the validity period may be indicated as time of day, day of week, calendar date, time offset from now, or any combination of the above.

According to further embodiments of this invention, the step 211 involves sending the query from the multi-session application 11a via server-side application component 10a.

The method 210 further includes step 212 of the multi-session application 11 establishing sessions to the content sources taking into account the priority indicated in the response 301, e.g., user client 11b located on the same network 90, and/or content server 51a, that is part of caching optimization service 50a, and/or user client 11y located outside of network 90, and/or content servers 21a located in dedicated network 110 outside of network 90.

The priority returned by the network optimization service in response 301 may indicate a ban on connecting to particular content sources.

According to some embodiments of this invention, the multi-session application 11 sets up sessions to content sources in strict compliance with the priority indicated in the response 301.

Alternatively, the multi-session application 11a may combine the priorities indicated in the response 301 with additional application-specific parameters and, optionally, overrule a ban on connecting to particular content sources.

The method 210 further includes an optional step 213 of the multi-session application sending a query for a content object or part of it, to at least one of the content servers 52a and 52b that comprise caching optimization service, as specified in the response 301.

The method 210 further includes step 214 of content server 52a checking whether the content object or portion of it referenced in query 302 is stored in the storage of content server 52a.

Further, in case of step 214 resulting in failure to locate content object or portion of it in the storage of content server 52a, method 210 includes a step 215 of content server 52a sending a query 302 for the content object or portion of it to, and receiving response from one or more content sources, including, but not limited to, other peer-to-peer application 11b, located in same network with the content server 52a, peer-to-peer application 11z, located in other network 100, and/or other content server 52b that is part of the caching optimization service 51a, and/or content server 52c that is part of content origination optimization service 51b, and/or content server 21a located in a dedicated server network 110.

According to some embodiments of this invention, the caching content server 52a may send queries for parts of the content object or the portion of it, as requested in the query 302 to multiple content sources, in series and/or in parallel.

According to some embodiments of this invention, the caching content server 52a may contact the server-side application component 10a for purposes of discovery of new content sources.

According to some embodiments of this invention, the content server 51a may apply network priority as provided by network prioritization optimization service 51c, to the selection of content sources, as described in step 212.

Method 210 optionally includes step 216 where the caching content server 52a may send queries for portions of the same content object referenced in query 302 that are not part of the portions of this object requested in query 302.

According to some embodiments of this invention, as part of step 216, the caching content server 52a may send queries for content objects or portions of them that are associated with the content object requested in query 302, including, but not limited to, content objects that are known to belong to same group of content objects, to same multi-session application, content objects referred to by the content object requested in query 302 (e.g., query 302 containing request for HTML or XML document, containing references to additional content objects, such as images, video files, application objects, script objects, stylesheets and more).

Further, the method 210 includes a step 217 of content server storing the responses to queries sent to one or more content sources, as part of steps 215 and 216, in the storage of content server 52a.

According to some embodiments of this invention, the step 217 is subject to application of algorithm that takes into account several factors, including, but not limited to identity and/or type and/or size of content object referenced in query 302, type of multi-session application 11a, time of day, known level demand for the content object, available storage capacity of content server 52a, current load of content server 52a and more.

Further, method 210 includes a step 218 of content server 52a responding to the query for content object, as described in step 213 above, by way of sending response 303 to the client user 11a.

The response 303 may contain denial of the query 302, due to unavailability of the requested content object or part of it in the local storage of content server 52a, and/or based on administrative policy of content server 52a, and/or due to inability of content server 52a to retrieve the requested content object or part of it from content sources that are permitted by the network optimization service 51c and/or due to inability of retrieve the request content item from any content source known to content server 52a.

Otherwise, the response 303 includes the requested content object or part of it, to the user client 11a, as requested in query 302

According to some embodiments of this invention, the response 303 may contain redirection of user client 11a to one or more content source, including but not limited to other content server 52b that is part of caching optimization service 51a, and/or content server 52c that is part of content origination optimization service 51b and/or dedicated content server 21a located in network 110, and/or user clients 11 running peer-to-peer applications.

Method 210 further includes an optional step 219 of user client 11a sending a query 304 to QoS arbitration service 51f for allocation of class-of-service and receiving a response 304 from it.

The query 304 may include various details, including type of class-of-service requested and/or definition of content source types that the class-of-service is requested for and/or network address of content source and/or type of protocol used.

The types of class-of-service requested as part of query 304 include, but are not limited to, "low throughput, low latency", "high throughput", minimum guaranteed throughput, maximum guaranteed throughput, the least priority service (the so-called "scavenger" type of service), set throughput for set period of time in the beginning of session etc.

This step optionally includes an intermediate step 201 of the QoS arbitration service discovery through service locator 50a.

The response 305 contains denial or grant of the request contained in query 304.

According to some embodiments of this invention, the decision of granting or denying the preferred class-of-service is conditioned on user client 11 contacting the network prioritization optimization service 51c prior to that, and additionally or alternatively contacting the caching optimization service 51a, and additionally on denial of request for content object by the caching optimization service.

The response 305 granting the class-of-service returns an application marker, including, but not limited to TCP or UDP source port, DiffServ control point (DSCP) value, HTTP cookie, Bittorrent extension field value or other application-level marker that can be used by the multi-session application to mark the preferred sessions differently from regular sessions.

According to some embodiments of this invention, the marker itself may include encoding of the requested class-of-service.

According to further embodiments of this invention, the marker can include a cryptographic token, that is optionally has validity for a limited time after response 305 is transmitted to user client 11a, protecting against re-use of the application marker by user client 11a or other user clients beyond use authorized by QoS arbitration service 51f, based on service requested in query 304.

Method 210 further includes step 220 of mark-up of sessions that the multi-session applications desires to receive a preferred class-of-service, for example session between user client 11a, located in network 90 and user client 11x located in network 100.

Method 210 further includes step 221 of classification of the marked sessions, performed by QoS device 60a located in or next to the data path between user client 11a and user client 11x, as sessions that require change of default class-of-service.

The session classification can be performed by QoS device 60a, based on Layer7 detection of custom application marker, and additionally and alternatively, based on analysis of Layer3 and/or Layer4 headers of the packets comprising the session.

Further, method 210 includes an optional intermediate step 222 of QoS device 60a sending a query 306 to the QoS arbitration service 51f, to which the QoS arbitration service 51f sends a response 307, confirming or denying the preferred class-of-service.

The query 306 may include type of protocol used by user client 11a to retrieve content, IP address and port of user client 11a, IP address and port of requested content source and, optionally, value of separate application marker, extracted by QoS device 60a from the session, as well administrative policy of QoS device 60a and/or network congestion information available to QoS device 60a.

According to some embodiments of this invention, in case of QoS device 60a being part of PCMM framework, the QoS arbitration service 51f may act as an PCMM application manager.

According to some embodiments of this invention, the QoS arbitration service 51f may reject or allow the query 306, depending on priorities defined for IP addresses by network prioritization service 51c.

Further, method 210 includes step 223 of QoS device 60a granting or denying the class-of-service requested by user client 11a, or, alternatively, granting another class-of-service.

QoS device 60a may decide on granting or denying the class-of-service, based on a variety of factors, including, but not limited to, administrative policy and/or network address of content source 11x and/or network address of user client 11a, and/or congestion on any part of the data path between 11a and 11x and/or taking into account response 307 of QoS arbitration service 51f, as described in step 222 above.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, e.g., in hardware, software, firmware, or any combination thereof. The techniques described above may be implemented in one or more computer programs executing on a programmable computer including a processor, a storage medium readable by the processor (including, e.g., volatile and non-volatile memory and/or storage elements), at least one input device, and at least one output device. Program code may be applied to input entered using the input device to perform the functions described and to generate output. The output may be provided to one or more output devices.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

What is claimed is:

1. An optimization service discovery method for optimizing data transmission by multi-session applications, comprising:
    providing a plurality of different optimization services for optimizing multi-session application performance;
    receiving at a service locator server an optimization service lookup query from one of a plurality of user clients in a network, each of said user clients executing a multi-session application, wherein the query includes one or more requested types of class-of-service, and the class-of-service includes a minimum throughput;
    selectively identifying at the service locator server one or more optimization services from the plurality of different optimization services, and responding to the query from the user client with a network address of one or more servers providing said one or more selectively identified optimization services, wherein (i) at least one of the one identified optimization services includes data directing at least one of the user clients to a content source that includes cached content that is responsive to a data query of the user client directed to the content source and (ii) the content source includes the cached content in response to direction at least one of the optimization services; and
    enforcing conditional access to the one or more selectively identified optimization services based on one or more of: location of the user client, authorization token, or additional type of conditional policy, previous use by the user client of one or more optimization services not included in the one or more selectively identified optimization services.

2. The method of claim 1 further comprising authenticating or authorizing said one of the plurality of user clients prior to responding to the query.

3. The method of claim 1 wherein responding to the query with a network address comprises responding to the query with network addresses of some, but not all, of the servers known to the service locator server providing the optimization service.

4. The method of claim 3 wherein said some of the servers are selected based on load balancing algorithms, actual current load of the servers, network distance and/or network cost between the servers and the user client requesting the service, availability of the servers, administrative policy, or time of day.

5. The method of claim 1 wherein said multi-session applications include different types of multi-session applications, including different types of peer-to-peer applications to access different types of peer-to-peer networks or different types of non-peer-to-peer applications that use multiple sessions to retrieve content.

6. The method of claim 1, wherein said plurality of different types of optimization services comprises at least two services from the group consisting of: a content caching service, a content origination service, a network prioritization service, a peer discovery service, a bootstrapping service for distributed networks, a QoS arbitration service, and a NAT traversal service.

7. A method of providing a network prioritization optimization service for delivery of content from a content source to one of a plurality of user clients in a network, the method comprising:

receiving a query for content source prioritization from one of a plurality of user clients in a network, each of said user clients executing a multi-session application;

identifying a set of content sources and an order of priority of each of the content sources responsive to the query based on the following aspects of content delivery:

topological locality of the network;

cost of links between the multi-session application of the one user client and the content source;

network congestion of the links;

cached content stored in at least one of the content sources at a direction of an optimization service, wherein the cached content is responsive to a data query of at least one of the user clients;

compliance with management policies of the network; and alignment with provisioning and capacity allocation of the network; and responding to the query by providing to the client from whom the query is received an identification and network addresses of the set of content sources and the order of priority of each of the content sources.

8. The method of claim 7 wherein said query identifies addresses of content sources known to the requesting user client.

9. The method of claim 7 wherein said query requests addresses of content sources.

10. The method of claim 7 wherein said set of content sources includes content sources that were previously unavailable to the multi-session application of the requesting user client.

11. The method of claim 7 wherein said set of content sources is identified using a peer discovery optimization service.

12. The method of claim 7 further comprising establishing sessions to said set of content sources in accordance with said order of priority.

13. The method of claim 7 further comprising sending a query for a content object to a caching optimization service comprising one or more dedicated content servers.

14. The method of claim 13 further comprising determining if the content object or part thereof exists on the content server, and if so, transmitting the content object or part thereof existing on the content server to the user client.

15. The method of claim 13 further comprising determining if the content object or part thereof exists on the one or more content servers, and if not, transmitting one or more queries for the content object to one or more content sources and storing responses on the content server.

16. The method of claim 13 further comprising prefetching associated content objects at the one or more content servers prior to being requested by a user client.

17. The method of claim 7 further comprising performing an optimization service lookup in response to a query from one of a plurality of user clients to identify said network prioritization optimization service.

18. The method of claim 7 further comprising identifying said set of content sources using a peer discovery optimization service.

19. The method of claim 7 further comprising receiving the query via a server-side application component.

20. The method of claim 7 wherein said order of priority of the content sources identifies a ban on one or more content sources.

21. The method of claim 7 further comprising receiving a request at a QoS arbitration service for allocation of class of service, and denying or granting said request.

22. The method of claim 7 wherein said content sources comprise different types of sources and said order of priority is based on the type of content source.

23. The method of claim 7 wherein the order of priority of the content sources is determined based on one or more policies.

24. The method of claim 23 wherein the one or more policies are based on topological network locality, cost of links between user clients and content sources, network congestion of links between user clients and content sources, compliance with network management policies, or alignment with network provisioning and capacity allocation.

* * * * *